United States Patent
Yamanaka

(10) Patent No.: US 6,459,460 B1
(45) Date of Patent: Oct. 1, 2002

(54) INFORMATION DISPLAY WINDOW OF ELECTRONIC APPLIANCE

(75) Inventor: Toshiki Yamanaka, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/281,791

(22) Filed: Mar. 31, 1999

(30) Foreign Application Priority Data

Apr. 3, 1998 (JP) .......................................... 10-108747

(51) Int. Cl.⁷ ...................... G02F 1/1333; G02F 1/1345
(52) U.S. Cl. .......................... 349/58; 349/60; 361/681; 361/683
(58) Field of Search ............................ 349/58; 361/681, 361/683

(56) References Cited

U.S. PATENT DOCUMENTS

| | | | |
|---|---|---|---|
| 4,417,411 A | * 11/1983 | Miyagishima et al. | ......... 40/443 |
| 5,446,707 A | * 8/1995 | Arakik | ......... 369/13 |
| 5,654,810 A | * 8/1997 | Okamura et al. | |
| 5,867,110 A | * 2/1999 | Naito et al. | ......... 340/995 |
| 5,936,600 A | * 8/1999 | Ohashi et al. | ......... 345/87 |
| 5,966,344 A | * 10/1999 | Toshio et al. | ......... 368/88 |
| 6,039,390 A | * 3/2000 | Agrawal et al. | ......... 296/211 |
| 6,297,582 B1 | * 10/2001 | Hirota et al. | ......... 313/110 |

FOREIGN PATENT DOCUMENTS

| | | | |
|---|---|---|---|
| EP | 237798 A2 | * | 9/1987 |
| EP | 237798 A2 | * | 9/1997 |
| JP | 3263241521 A | * | 10/1988 |
| JP | 64-35629 | | 3/1989 |
| JP | 2-37798 | | 2/1990 |
| JP | 404287186 A | * | 10/1992 |
| JP | 5-71416 | | 9/1993 |
| JP | 7-26233 | | 5/1995 |
| JP | 7-36460 | | 7/1995 |
| JP | 408167025 A | * | 6/1996 |
| JP | 408227073 A | * | 9/1996 |
| JP | 409065028 A | * | 3/1997 |
| JP | 41102440 A | * | 1/1999 |
| JP | 2000206498 A | * | 7/2000 |

* cited by examiner

Primary Examiner—Toan Ton
Assistant Examiner—Hoan Nguyen
(74) Attorney, Agent, or Firm—Young & Thompson

(57) ABSTRACT

An information display window of an electronic appliance, which improves the cosmetic design without increasing the cost, is provided. The information display window is provided at a cabinet of a mobile telephone. A display is provided in the cabinet as a built-in type. The information display window is constituted of an opening part formed in the cabinet to the front direction of the display and a transparent panel fitted into the opening part. The transparent panel is made of synthetic resin and the outer surface of the transparent panel has a glossy surface and the inner surface of the transparent panel is formed to a satin finish surface. A rim of the opening part of the cabinet becomes a window frame and a step part is formed at the whole inner rim of the window frame on the outside surface of the window frame. The outer rim of the transparent panel is disposed at the step part of the window frame and the transparent panel is supported on the window frame. The inner surface of the outer rim of the transparent panel and the upper surface of the step part of the window frame is stuck with adhesive tape on both sides and the transparent panel is fixed on the window frame of the cabinet.

3 Claims, 7 Drawing Sheets

INFORMATION DISPLAY WINDOW OF ELECTRONIC APPLIANCE

BACKGROUND OF THE INVENTION

The present invention relates to an information display window of an electronic appliance, such as a portable communication terminal, audio equipment and so forth, and the information display window is built in the cabinet of the appliance.

DESCRIPTION OF THE RELATED ART

The electronic appliance, such as a mobile telephone, a portable CD player and so forth, has for example a built-in LCD (liquid crystal display) and displays various kinds of information, such as telephone numbers, music numbers and the operating state of the appliance. Generally, in these small sized appliances, an information display window is formed at the cabinet and the surface of the LCD is exposed through this window.

FIG. 1 is a sectional view showing an information display window part of the conventional small sized electronic appliance. FIG. 2 is an expanded sectional view showing a transparent panel used in the information display window shown in FIG. 1. A cabinet 102 has a built-in LCD 104 and an opening part 106 is formed at the front part of the cabinet 102 and a transparent panel 108 made of for example synthetic resin is fitted into the opening part 106 and an information display window 110 is formed. Generally, the outer surface 112 of the transparent panel 108 has a satin finish and the gloss of the outer surface is lessened as shown in FIG. 2.

In order to make the product value of electronic appliances high at the viewpoint of cosmetic design, there are many cases that designers make the outer surface 114 of the cabinet 102 glossy. However, as mentioned above, the outer surface 112 of the transparent panel 108 has a satin finish and the gloss of the outer surface 112 is lessened, therefore the total cosmetic design including the cabinet 102 and the information display window 110 does not have unity and is not satisfied. Recently the information display 110 has been large sized, because the information quantity to be displayed has increased, therefore this kind of problem is liable to occur.

Moreover, at the case that the rim part of the outer surface 112 of the transparent panel 108 is chamfered as shown in FIG. 1 and is made to be the same height level of the outer surface 114 surrounding the opening part 106 of the cabinet 102, the satin finish of the chamfered part 116 is taken out by the cutting process for chamfering and the chamfered part 116 becomes glossy. As a result, the gloss of the center part and the rim part of the transparent panel 108 becomes different and there is a problem that the total cosmetic design has some strange feeling. This problem must be improved.

On the other hand, it is possible that the outer surface 112 of the transparent panel 108 is not processed to be a satin finish and has a polished surface. However, in this case, at the time when fine dust enters into the space between the surface of the LCD 104 and the transparent panel 108 during the manufacturing time or the operating time of the appliance, the fine dust is liable to be seen because the transparent panel 108 is fully transparent and the fine scratch formed on the surface of the LCD 104 is also liable to be seen.

Therefore, in order not to make the fine dust enter into the space between the surface of the LCD 104 and the transparent panel 108 during the manufacturing time, a big facility such as a clean room is needed or a severe inspection is required. Moreover, the changing frequency of the LCD 104 becomes high. With this, the total cost is increased by the required investment, part cost and labor cost.

The Japanese Utility Model Application Laid-Open No. HEI 7-26233 discloses a display panel in which at the case that the display panel is covered with a curved surface glass, a doubled image is liable to be displayed by the reflection light of the inner surface of the glass. In order to avoid the doubled image, the sandblasting is applied to the inner surface of the glass. And this sandblasting process is also able to be implemented by a molding process.

The Japanese Patent Application Laid-Open No. HEI 2-37798 discloses a fixing method of a panel cover to a cabinet in which a rubber made switch is used and this rubber made switch has a convex shape part and the panel cover is pushed into the place between the panel and the convex shape part of the rubber switch. With this, the panel cover does not vibrate, and any screws or glue or any jigs to fix the panel cover are not needed and the assembly process is simplified.

The Japanese Utility Model Application Laid-Open No. HEI 5-71416 discloses a mechanism fixing a front glass to a panel which does not use adhesive tape on both sides and fits the front glass into the panel mechanically. With this, the painting at the place of adhesive tape is not needed and the assembly process is simplified.

SUMMARY OF THE INVENTION

It is therefore an object of the present invention to provide an information display window of an electronic appliance that is able to improve the cosmetic design without making the cost increase.

According to a first aspect of the present invention, for achieving the above mentioned objects, an information display window of an electronic appliance which is provided at a cabinet of an electronic appliance having a built-in display is constituted of an opening part formed in the cabinet to the front surface of said display and a transparent panel fitted into said opening part. And an outer surface of said transparent panel is a glossy surface and an inner surface of said transparent panel is a satin finish surface.

According to a second aspect of the present invention, said transparent panel is made of synthetic resin and is generally formed into a rectangular shape.

According to a third aspect of the present invention, a rim of said opening part becomes a window frame and a step part being low to the inside direction of said cabinet is formed at the whole inner rim of said window frame and said transparent panel is supported by said window frame, by that the outer rim of said transparent panel is disposed on said step part of said window frame.

According to a fourth aspect of the present invention, said window frame is formed with said cabinet as one body.

According to a fifth aspect of the present invention, an inner surface of the outer rim of said transparent panel and an upper surface of said step part of said window frame are stuck with adhesive tape on both sides.

According to a sixth aspect of the present invention, a film of paint is painted on the inner surface of the outer rim of said transparent panel.

According to a seventh aspect of the present invention, said outer rim of the outer surface of said transparent panel is formed to be a slant shape whose thickness is that the nearer to the end of the outer rim is, the thinner the thickness is.

According to a eighth aspect of the present invention, an outer surface of said transparent panel is formed to a curved shape in convex shape to the outside direction.

According to a ninth aspect of the present invention, said transparent panel is formed by a curved plate and is a convex shape to the outside direction.

According to a tenth aspect of the present invention, a rim of said opening part becomes a window frame and a step part being low to the outside direction of said cabinet is formed at the whole inner rim of said window frame and a step part being low to the inside direction of said cabinet is formed at the whole outer rim of said transparent panel on the outside surface of said transparent panel and said transparent panel is supported by said window frame, by that said step part of said window frame is fitted into said step part of said transparent panel.

According to an eleventh aspect of the present invention, said electronic appliance is a portable electronic appliance and said portable electronic appliance is a communication apparatus and said communication apparatus is any of a communication terminal, a radio selective-calling receiver and an individual calling receiver and said portable electronic appliance is audio equipment and said audio equipment is any of a CD player, a tape-recorder and a MD player and so forth.

According to the present invention, the outer surface of said transparent panel is a glossy surface, even the cabinet of the electronic apparatus has a glossy surface, the unity feeling of the cabinet and the information display window is not lost. Further, the inner surface of the transparent panel is a satin finish surface, therefore even at the case that fine dust is entered into the space between the transparent panel and the display, or the front surface of the LCD has some scratches being practically no problem, these fine dust or some scratches are actually not noticeable.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
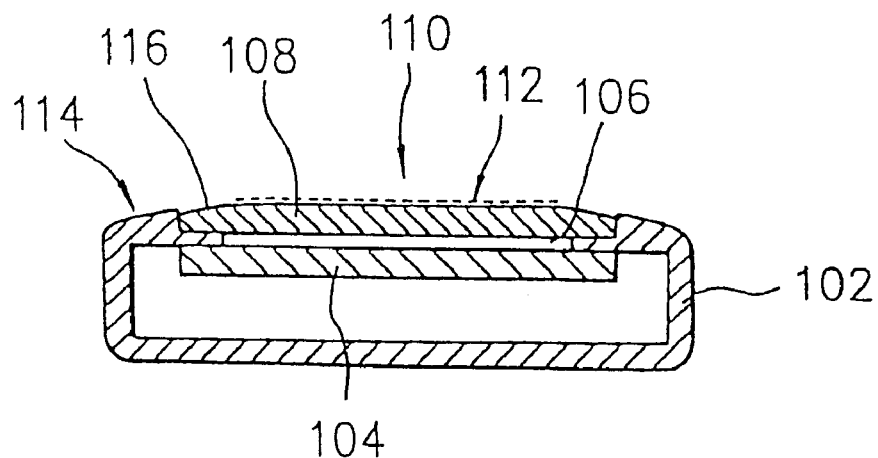
FIG. 1 is a sectional view showing an information display window part of the conventional small sized electronic appliance.
Figure 2:
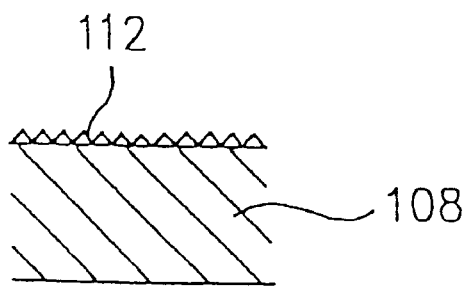
FIG. 2 is an expanded sectional view showing a transparent panel used in the information display window shown in FIG. 1.
Figure 3:
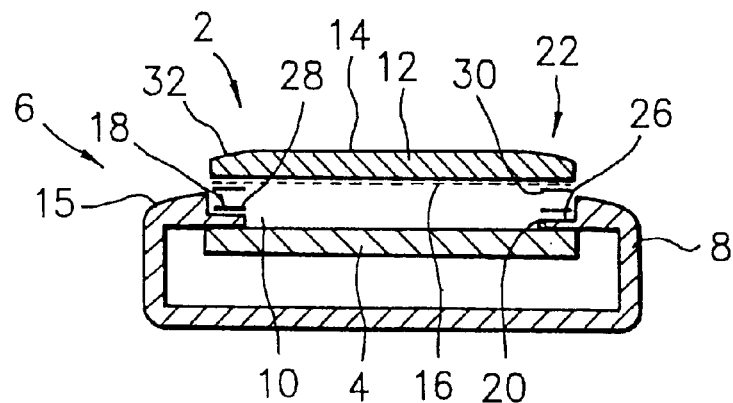
FIG. 3 is a sectional view showing a first embodiment of an information display window of an electronic appliance of the present invention.
Figure 4:
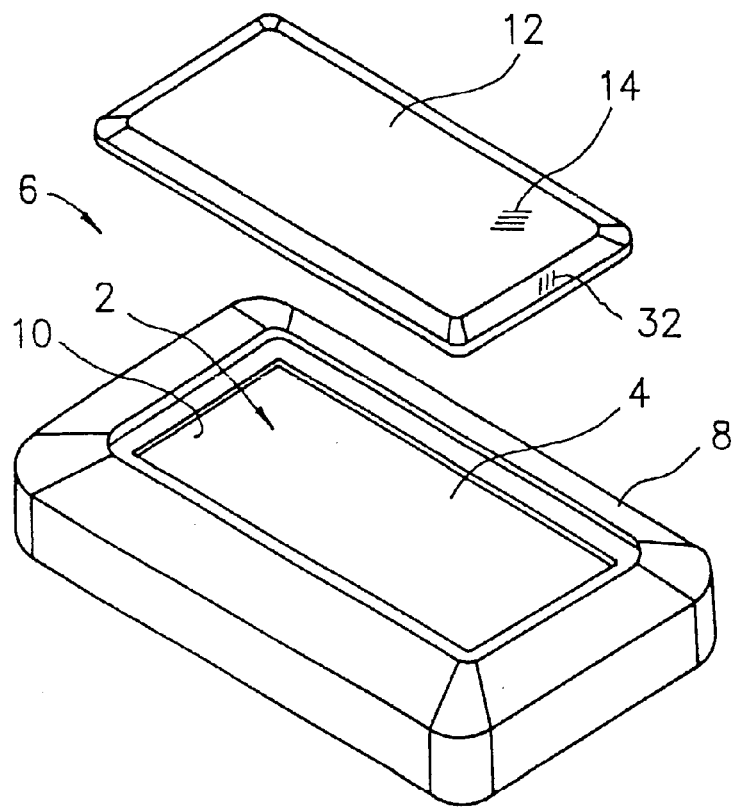
FIG. 4 is a perspective view showing the electronic appliance in FIG. 3.
Figure 5:
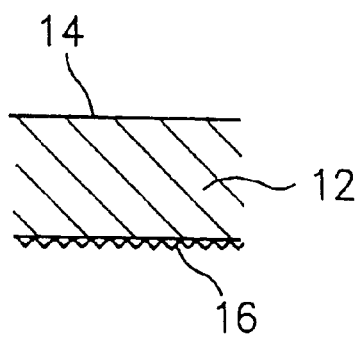
FIG. 5 is an expanded sectional view showing a transparent panel of the information display window in FIG. 3.

Referring now to the drawings, embodiments of the present invention are explained in detail. FIG. 3 is a sectional view showing a first embodiment of an information display window of an electronic appliance of the present invention. FIG. 4 is a perspective view showing the electronic appliance in FIG. 3. FIG. 5 is an expanded sectional view showing a transparent panel of the information display window in FIG. 3. As shown in FIGS. 3 and 4, an information display window 2 is provided for example in a mobile telephone 6. The information display window 2 is constituted of a LCD (liquid crystal display) 4 as a built-in type in the mobile telephone 6, a generally rectangular shaped opening part 10 formed at the front part of the cabinet 8 and a generally rectangular shaped transparent panel 12 fitted into the opening part 10.

At this embodiment, the transparent panel 12 is made of synthetic resin and an outer surface 14 of the transparent panel 12 is glossy and an inner surface 16 of the transparent panel 12 has a satin finish as shown in FIG. 5.

The rim of the opening part 10 becomes a window frame 18. A lower step part 20 is formed to the inner direction of the cabinet 8 at the whole inner rim of the window frame 18. The outer rim 22 of the transparent panel 12 is disposed at the step part 20 of the window frame 18 and the transparent panel 12 is supported by the window frame 18. At this embodiment, the window frame 18 is a part of the cabinet 8 and is formed together with the cabinet 8.

The transparent panel 12 is fixed at the window frame 18 of the cabinet 8 by sticking the part of the inner surface 16 located at the outer rim 22 of the transparent panel 12 and the upper surface 26 of the step part 20 of the window frame 18 with the adhesive tape on both sides.

The part of the inner surface 16 located at the outer rim 22 of the transparent panel 12 is painted with a film of paint 30, and then the adhesive tape on both sides is not visible from the outside. This film of paint 30 is able to be formed by silk screen printing.

The part of the outer surface 14 located at the rim 22 of the transparent panel 12 is chamfered and becomes a chamfered part 32 and is formed to a slant that the thinner the thickness is the nearer the outside is. As a result, at the time when the transparent panel 12 is fitted into the window frame 18, the height of the part of the outer surface 14 located at the rim 22 of the transparent panel 12 becomes almost the same height as that of the outer surface 15 of the window frame 18.

Figure 6A:
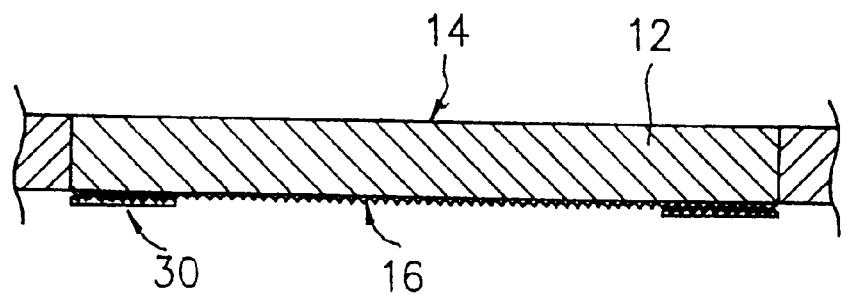
FIG. 6A is a processing diagram showing the manufacturing method of the information display window.
Figure 6B:
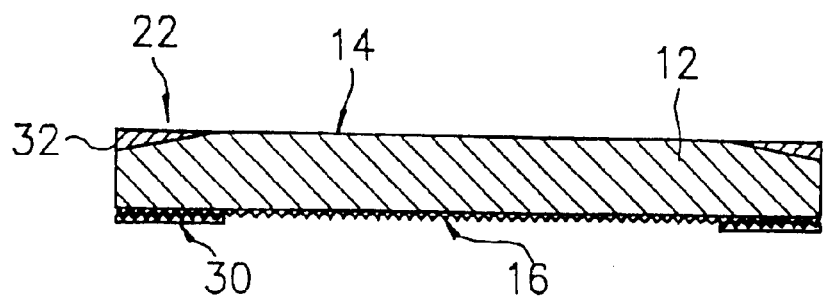
FIG. 6B is a processing diagram showing the manufacturing method of the information display window.

The transparent panel 12 being a component of the information display window 2 is manufactured by the following process. FIGS. 6A and 6B are processing diagram showing the manufacturing method of the information display window 2. As shown in FIG. 6A, the transparent panel 12 whose one surface is glossy and the other surface has a satin finish is provided. The film of paint 30 is painted to the outer rim 22 of the inner surface 16 by for example silk screen printing. After this process, the transparent panel 12 is cut to meet the outside shape of the window frame 18.

Next, as shown in FIG. 6B, the outer rim 22 of the outer surface 14 of the transparent panel 12 is chamfered and the chamfered part 32 is formed by making the height of the outer rim 22 of the outer surface 14 of the transparent panel 12 the same height of the outer surface 15 of the window frame 18. Then, the transparent panel 12 is completed.

As mentioned above, at the information display window 2 of the first embodiment of the present invention, the outer surface 14 of the transparent panel 12 is glossy, therefore even at the case that the outer surface of the cabinet 8 of the mobile telephone 6 has a glossy surface, the unification of the cabinet 8 and the information display window 12 is not lost. Therefore, the product value of the mobile telephone 6 is able to be increased by improving the cosmetic design of the cabinet 8 and the information display window 2.

As the inner surface 16 of the transparent panel 12 is formed to a satin finish surface, even at the time when fine dust is entered the space between the transparent panel 12 and the LCD 4 or fine scratch being practically no problem is at the surface of the LCD 4, the fine dust and fine scratch are not practically noticeable.

Therefore, a big facility such as a clean room is not needed in order to prevent dust from entering at the time of manufacturing, and a severe inspection is also not needed and the changing frequency of the LCD 4 is not increased. With this, the investment and parts cost and labor cost are not increased.

Moreover, as mentioned above, at the outer rim 22 of the outer surface 14 of the transparent panel 12, the chamfered part 32 is provided. Even the chamfered part 32 becomes a glossy surface by the cutting process, the outer surface 14 of the transparent panel 12 has originally a glossy surface, the gloss of the center part of the transparent panel 12 is not different from the gloss of the outer rim 22, therefore the cosmetic design has no strange feeling.

Figure 7A:
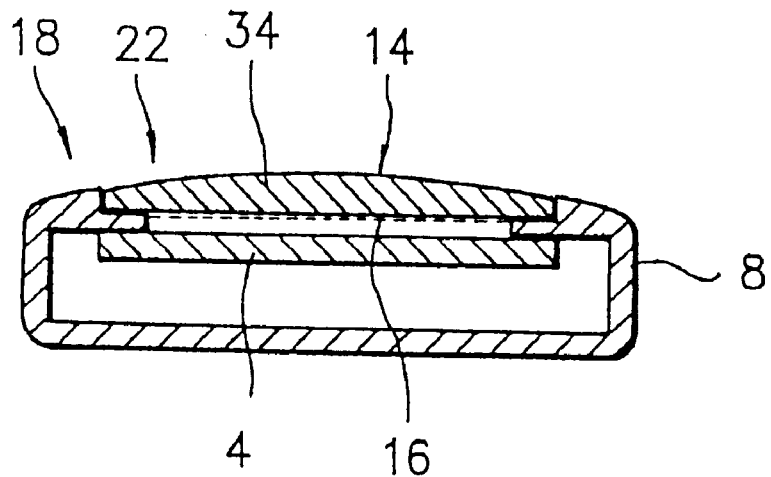
FIG. 7A is a sectional view showing a second embodiment of an electronic appliance providing an information display window.
Figure 7B:
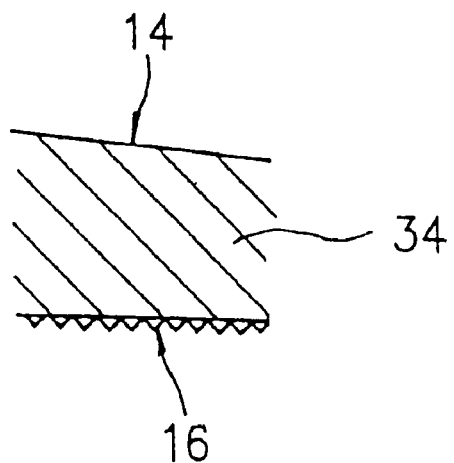
FIG. 7B is an expanded sectional view of a transparent panel of the information display window in FIG. 7A.

Next, a second embodiment of the present invention is explained. FIG. 7A is a sectional view showing a second embodiment of an electronic appliance providing an information display window. FIG. 7B is an expanded sectional view of a transparent panel of the information display window. In FIGS. 7A and 7B, the same elements in FIGS. 3 and 5 are attached the same sign numbers.

The difference between the second embodiment and the first embodiment is that an outer surface 14 of a transparent panel 34 of the second embodiment is formed to a curve shaped being convex to outside direction as shown in FIG. 7A. This kind of transparent panel is able to be formed by for example injection molding. At this time, a satin finish surface is formed on the surface of the molding die and the satin finish is transferred to an inner surface 16 of the transparent panel 34 at the time of molding.

At the case that the cosmetic design of the transparent panel 34 is decided as shown in FIG. 7B, the satin finish is formed on the inner surface 16 of the transparent panel 34, therefore the same effect of the first embodiment is obtained in the second embodiment. Moreover, at the second embodiment, the transparent panel 34 is formed by using the molding die as mentioned above, the additional chamfering process to make the height of the rim of the window frame 18 and the rim 22 of the transparent panel 34 the same level is not needed, therefore the labor cost is able to be decreased.

Figure 8A:
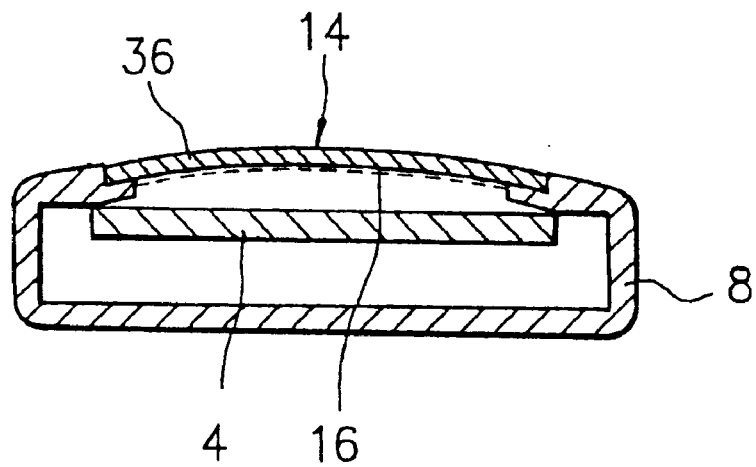
FIG. 8A is a sectional view showing a third embodiment of an electronic appliance providing an information display window.
Figure 8B:
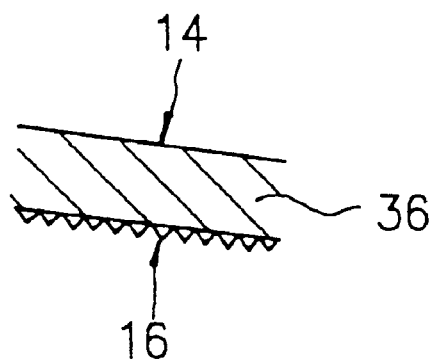
FIG. 8B is an expanded sectional view of a transparent panel of the information display window in FIG. 8A.

Next, a third embodiment of the present invention is explained. FIG. 8A is a sectional view showing a third embodiment of an electronic appliance providing an information display window. FIG. 8B is an expanded sectional view of a transparent panel of the information display window. In FIGS. 8A and 8B, the same elements in FIGS. 3 and 5 are attached the same sign numbers.

The difference between the third embodiment and the second embodiment is that a transparent panel 36 of the third embodiment is made of a plate and is formed to a curve shaped being convex to outside direction as shown in FIG. 8A. This kind of transparent panel is able to be formed by for example bending process for a flat plate. At this time, a satin finish is formed on the surface of the plate beforehand, as shown in FIG. 8B, the inner surface 16 of the transparent panel 36 has a satin finish surface. Therefore, the same effect of the first embodiment is obtained, moreover the chamfering process for the transparent panel 36 is not needed like as the second embodiment.

Figure 9A:
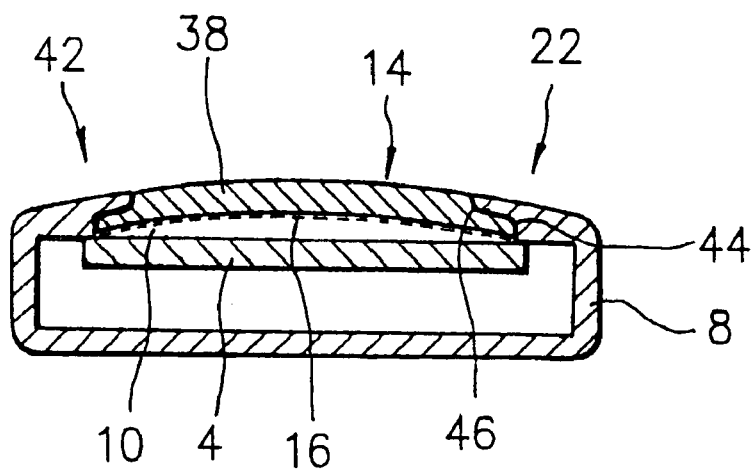
FIG. 9A is a sectional view showing a fourth embodiment of an electronic appliance providing an information display window.
Figure 9B:
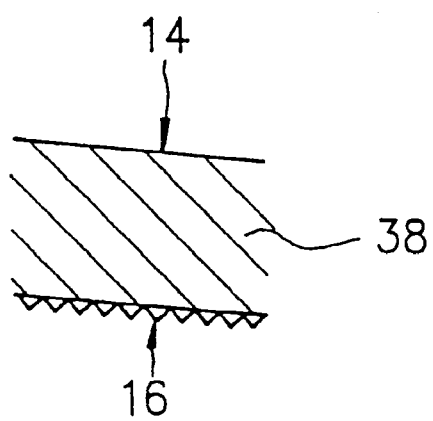
FIG. 9B is an expanded sectional view of a transparent panel of the information display window in FIG. 9A.

Next, a fourth embodiment of the present invention is explained. FIG. 9A is a sectional view showing a fourth embodiment of an electronic appliance providing an information display window. FIG. 9B is an expanded sectional view of a transparent panel of the information display window. In FIGS. 9A and 9B, the same elements in FIGS. 3 and 5 are attached the same sign numbers.

The difference between the fourth embodiment and the third embodiment is that the construction of an outer rim 22 of a transparent panel 38 and a window frame 42 of the fourth embodiment are different from the third embodiment. As shown in FIG. 9A, the opening part 10 of the cabinet 8 becomes a window frame 42. At the whole inner rim of the window frame 42, a step part 44 being wider hole shaped to the inside direction is provided. At the outer rim 22 of a curved transparent panel 38, a step part 46 being wider shaped to the inside direction is provided. The transparent panel 38 is fitted into the window frame 42 from the inside direction of the cabinet 8. The step part 44 of the window frame 42 and the step part 46 of the transparent panel 38 are stuck and fixed. In the fourth embodiment, the window frame 42 is formed in the cabinet 8 as one body.

As shown in FIG. 9B, the transparent panel 38 is formed with a curved material and the one surface of the material has a satin finish surface, therefore, the same effect of the first and second embodiments is obtained. Moreover, in this case, the stuck part of the outer rim 22 of the transparent panel 38 and the window frame 42 is covered with the window frame 42, therefore a film of paint is not needed and the cost is reduced.

Figure 10A:
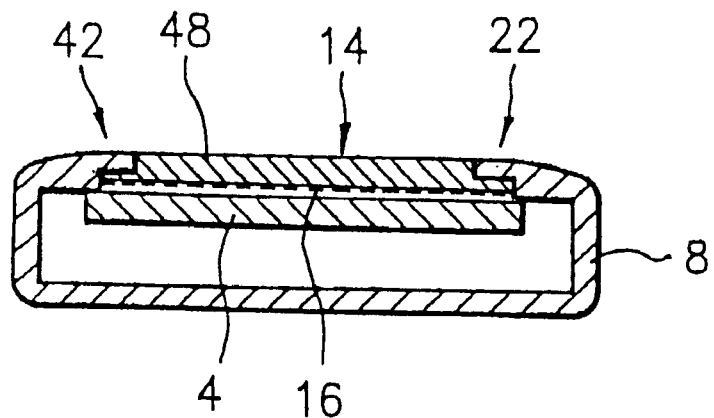
FIG. 10A is a sectional view showing a fifth embodiment of an electronic appliance providing an information display window.
Figure 10B:
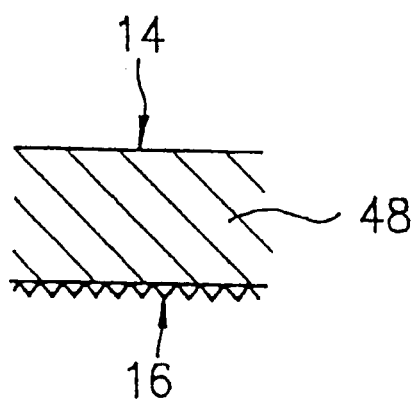
FIG. 10B is an expanded sectional view of a transparent panel of the information display window in FIG. 10A.

Next, a fifth embodiment of the present invention is explained. FIG. 10A is a sectional view showing a fifth embodiment of an electronic appliance providing an information display window. FIG. 10B is an expanded sectional view of a transparent panel of the information display window. In FIGS. 10A and 10B, the same elements in FIGS. 9A and 9B are attached the same sign numbers.

The difference between the fifth embodiment and the fourth embodiment is that a transparent panel 48 is not curved and flat. As shown in FIG. 10B, the inner surface 16 of the transparent panel 48 has a satin finish, therefore the same effect of the first embodiment is able to be obtained. Moreover, the stuck part of the outer rim 22 of the transparent panel 48 and the window frame 42 is covered with the window frame 42, therefore a film of paint is not needed and the cost is reduced.

As mentioned above, the embodiments of the present invention are explained, however the present invention is not limited to these embodiments and applicable to various cases.

For example, in the mentioned above embodiments, the present invention is applied to a mobile telephone. However the present invention is applicable to electronic appliances providing an information display window, such as communication apparatuses including a communication terminal, a radio selective-calling receiver, an individual calling receiver and the audio equipment including a CD player, a tape-recorder, a MD player and so forth.

In the mentioned above embodiments, as a display, a LCD (liquid crystal display) is used, however the other display is usable for the present invention.

As mentioned above, at the information display window of the electronic appliance of the present invention, the outer surface of the transparent panel has a glossy surface, therefore even at the case that the outer surface of the cabinet of the mobile telephone has a glossy surface, the feeling as one body with the information display window is not lost. Therefore, the cosmetic design of the cabinet is improved and the product value is able to be increased.

The inner surface of the transparent panel has a satin finish surface, even fine dust is entered into the space between the transparent panel and the display or some fine scratches being practically no problem are on the surface of the LCD, these are not actually noticeable. Therefore, a big facility such as a clean room to prevent dust from entering at the manufacturing time and a severe inspection are not needed and further the changing frequency of the LCD is not increased. With this, the investment, parts cost and labor cost are not increased.

Moreover, even the chamfered part is provided at the outer rim of the outer surface of the transparent panel and the chamfered part becomes glossy by a cutting process, the upper surface of the transparent panel is originally glossy, therefore the gloss of the center part and outer rim of the transparent panel is not different and there is no strange feeling of the cosmetic design.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A window for an electronic device having a cabinet housing a built-in information display that is to be viewed through the window, the window comprising:

an inwardly extending peripheral wall defining an opening in the cabinet, said peripheral wall having an interior surface to which the information display is affixed and an exterior surface that defines a portion of an exterior of the cabinet, said interior surface of said peripheral wall having a notch therein that defines a canopy extending inwardly from said exterior surface of said peripheral wall; and a transparent panel with a peripheral step in an exterior surface thereof, said step having an exterior surface affixed to an interior surface of said canopy, said step being sandwiched between said canopy and the information display, said transparent panel having an interior surface with a satin finish, said exterior surface of said transparent panel having a glossy finish.

2. The window of claim 1, wherein said exterior surface of said transparent panel is arched.

3. The window of claim 1, wherein said exterior surface of said transparent panel is flat.

* * * * *